United States Patent
Gladwin et al.

(10) Patent No.: US 7,904,475 B2
(45) Date of Patent: *Mar. 8, 2011

(54) VIRTUALIZED DATA STORAGE VAULTS ON A DISPERSED DATA STORAGE NETWORK

(75) Inventors: S. Christopher Gladwin, Chicago, IL (US); Greg Dhuse, Chicago, IL (US); Vance Thornton, Chicago, IL (US); Mainsh Motwani, Chicago, IL (US); Ilya Volvovski, Chicago, IL (US); Wesley Leggette, Oak Park, IL (US); Jamie Bellanca, Chicago, IL (US); Sarah Toledano, Chicago, IL (US); Lynn Foster, Oak Park, IL (US); Zachary Mark, Chicago, IL (US)

(73) Assignee: Cleversafe, Inc., Chicago, IL (US)

( * ) Notice: Subject to any disclaimer, the term of this patent is extended or adjusted under 35 U.S.C. 154(b) by 269 days.

This patent is subject to a terminal disclaimer.

(21) Appl. No.: 11/973,621

(22) Filed: Oct. 9, 2007

(65) Prior Publication Data

US 2009/0094251 A1 Apr. 9, 2009

(51) Int. Cl.
*G06F 17/30* (2006.01)

(52) U.S. Cl. ......... 707/781; 707/831; 707/786; 707/959; 711/154; 711/156

(58) Field of Classification Search .................. 709/201; 707/200, 201, 204, 687, 821, 824, 825, 831, 707/694, 781, 786, 697, 959; 711/154, 156
See application file for complete search history.

(56) References Cited

U.S. PATENT DOCUMENTS

| | | | |
|---|---|---|---|
| 4,092,732 A | | 5/1978 | Ouchi |
| 5,485,474 A | * | 1/1996 | Rabin ........................... 714/762 |
| 5,809,285 A | | 9/1998 | Hilland |
| 5,890,156 A | | 3/1999 | Rekieta et al. |
| 5,987,622 A | | 11/1999 | Lo Verso et al. |
| 5,991,414 A | | 11/1999 | Garay et al. |
| 6,012,159 A | | 1/2000 | Fischer et al. |
| 6,058,454 A | | 5/2000 | Gerlach et al. |
| 6,128,277 A | | 10/2000 | Bruck et al. |
| 6,192,472 B1 | | 2/2001 | Garay et al. |
| 6,256,688 B1 | | 7/2001 | Suetaka et al. |
| 6,272,658 B1 | | 8/2001 | Steele et al. |
| 6,366,995 B1 | | 4/2002 | Vilkov et al. |
| 6,374,336 B1 | | 4/2002 | Peters et al. |
| 6,879,596 B1 | | 4/2002 | Dooply |
| 6,415,373 B1 | | 7/2002 | Peters et al. |
| 6,418,539 B1 | | 7/2002 | Walker |

(Continued)

OTHER PUBLICATIONS

Chung, "An Automatic Data Segmentation Method for 3D Measured Data Points," National Taiwan University, 1998, pp. 1-8.

(Continued)

*Primary Examiner* — Jean M Corrielus
(74) *Attorney, Agent, or Firm* — Garlick Harrison & Markison; Timothy W. Markison

(57) ABSTRACT

A system, method, and apparatus for implementing a plurality of dispersed data storage networks using a set of slice servers are disclosed. A plurality of information records are maintained, with each information record corresponding to a dispersed data storage network. The information record maintains what slice servers are used to implement the dispersed data storage network, as well as other information needed to administer a DDSN, such as the information dispersal algorithm used, how data is stored, and whether data is compressed or encrypted.

14 Claims, 4 Drawing Sheets

U.S. PATENT DOCUMENTS

| | | |
|---|---|---|
| 6,449,688 B1 | 9/2002 | Peters et al. |
| 6,785,768 B2 | 10/2002 | Peters et al. |
| 6,760,808 B2 | 12/2002 | Peters et al. |
| 7,024,609 B2 | 1/2003 | Wolfgang et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 7,103,824 B2 | 6/2004 | Halford |
| 6,826,711 B2 | 11/2004 | Moulton et al. |
| 7,003,688 B1 | 2/2006 | Pittelkow et al. |
| 7,024,451 B2 | 4/2006 | Jorgenson |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,240,236 B2 | 7/2007 | Cutts et al. |
| 7,546,427 B2 * | 6/2009 | Gladwin et al. ............... 711/154 |
| 2002/0166079 A1 | 11/2002 | Ulrich et al. |
| 2004/0024963 A1 | 2/2004 | Talagala et al. |
| 2005/0114594 A1 | 5/2005 | Corbett et al. |
| 2005/0125593 A1 | 6/2005 | Karpoff et al. |
| 2005/0144382 A1 | 6/2005 | Schmisseur |
| 2006/0047907 A1 | 3/2006 | Shiga et al. |
| 2006/0224603 A1 * | 10/2006 | Correll ........................... 707/100 |
| 2007/0079081 A1 * | 4/2007 | Gladwin et al. ............... 711/154 |
| 2007/0079082 A1 | 4/2007 | Gladwin et al. |
| 2007/0079083 A1 * | 4/2007 | Gladwin et al. ............... 711/154 |
| 2007/0174192 A1 * | 7/2007 | Gladwin et al. ................ 705/40 |

OTHER PUBLICATIONS

Young, International Search Report and Written Opinion of the International Searching Authority for PCT/US 08/77166, Nov. 25, 2008.

Shamir, "How to Share a Secret" Communications of the ACM, vol. 22, No. 11, Nov. 1979.

Rabin, "Efficient Dispersal of Information for Security, Load Balancing, and Fault Tolerance" Journal of the Association for Computer Machinery, vol. 36, No. 2, Apr. 1989.

Plank, T1: Erasure Codes for Storage Applications; FAST 2005, 4th Usenix Conference on File and Storage Technologies; Dec. 13-16, 2005; pp. 1-74.

* cited by examiner

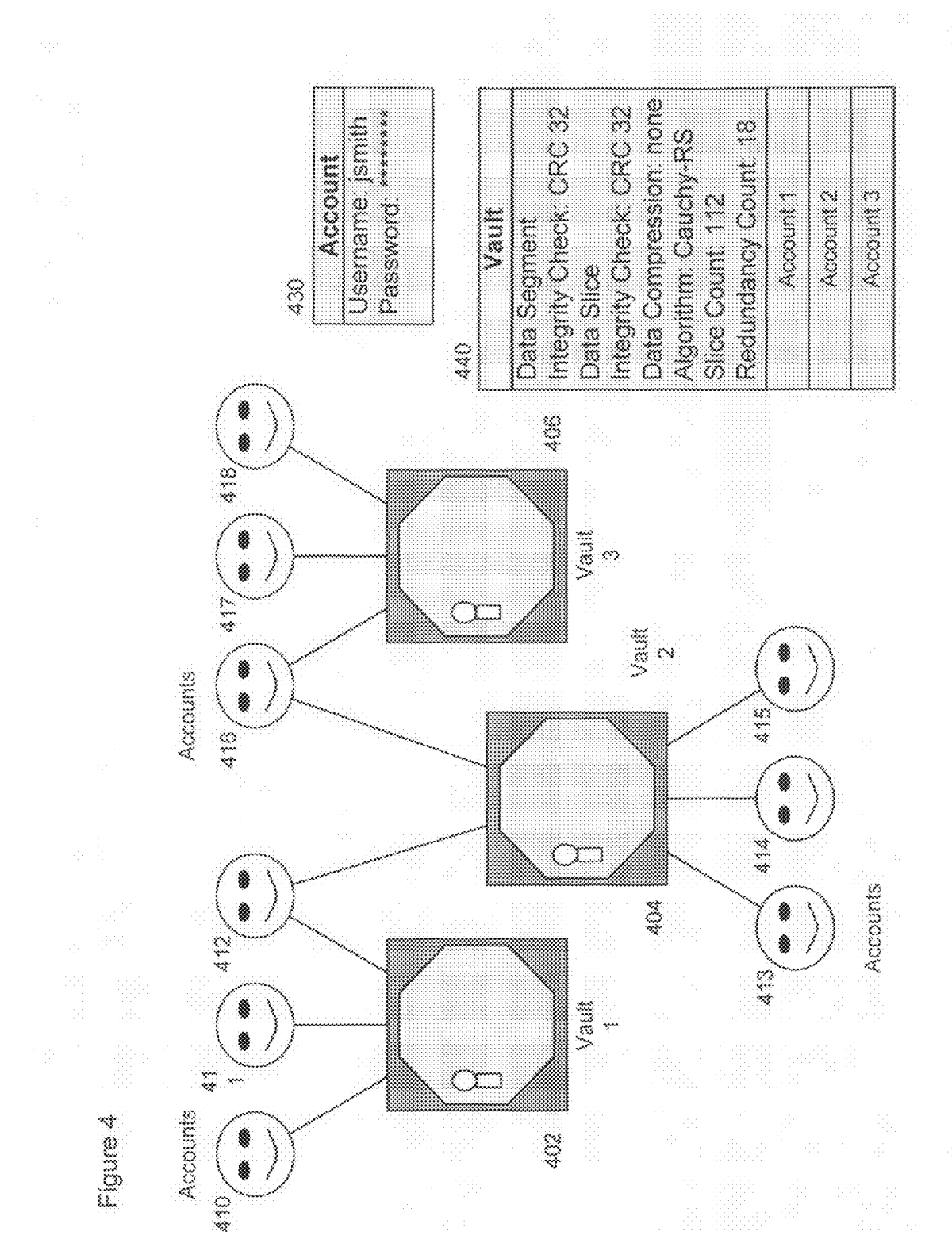

VIRTUALIZED DATA STORAGE VAULTS ON A DISPERSED DATA STORAGE NETWORK

FIELD OF THE INVENTION

The present invention relates generally to systems, apparatus, and methods for distributed data storage, and more particularly to systems, apparatus, and methods for distributed data storage using an information dispersal algorithm so that no one location will store an entire copy of stored data, and more particularly still to systems, apparatus, and methods for using a fixed number of slice servers to implement a plurality of dispersed data storage networks.

DESCRIPTION OF THE PRIOR ART

Storing data in digital form is a well-known problem associated with all computer systems, and numerous solutions to this problem are known in the art. The simplest solution involves merely storing digital data in a single location, such as a punch film, hard drive, or FLASH memory device. However, storage of data in a single location is inherently unreliable. The device storing the data can malfunction or be destroyed through natural disasters, such as a flood, or through a malicious act, such as arson. In addition, digital data is generally stored in a usable file, such as a document that can be opened with the appropriate word processing software, or a financial ledger that can be opened with the appropriate spreadsheet software. Storing an entire usable file in a single location is also inherently insecure as a malicious hacker only need compromise that one location to obtain access to the usable file.

To address reliability concerns, digital data is often "backed-up," i.e., an additional copy of the digital data is made and maintained in a separate physical location. For example, a backup tape of all network drives may be made by a small office and maintained at the home of a trusted employee. When a backup of digital data exists, the destruction of either the original device holding the digital data or the backup will not compromise the digital data. However, the existence of the backup exacerbates the security problem, as a malicious hacker can choose between two locations from which to obtain the digital data. Further, the site where the backup is stored may be far less secure than the original location of the digital data, such as in the case when an employee stores the tape in her home.

Another method used to address reliability and performance concerns is the use of a Redundant Array of Independent Drives ("RAID"). RAID refers to a collection of data storage schemes that divide and replicate data among multiple storage units. Different configurations of RAID provide increased performance, improved reliability, or both increased performance and improved reliability. In certain configurations of RAID, when digital data is stored, it is split into multiple units, referred to as "stripes," each of which is stored on a separate drive. Data striping is performed in an algorithmically certain way so that the data can be reconstructed. While certain RAID configurations can improve reliability, RAID does nothing to address security concerns associated with digital data storage.

One method that prior art solutions have addressed security concerns is through the use of encryption. Encrypted data is mathematically coded so that only users with access to a certain key can decrypt and use the data. Common forms of encryption include DES, AES, RSA, and others. While modern encryption methods are difficult to break, numerous instances of successful attacks are known, some of which have resulted in valuable data being compromised.

In 1979, two researchers independently developed a method for splitting data among multiple recipients called "secret sharing." One of the characteristics of secret sharing is that a piece of data may be split among n recipients, but cannot be known unless at least t recipients share their data, where n≧t. For example, a trivial form of secret sharing can be implemented by assigning a single random byte to every recipient but one, who would receive the actual data byte after it had been bitwise exclusive orred with the random bytes. In other words, for a group of four recipients, three of the recipients would be given random bytes, and the fourth would be given a byte calculated by the following formula:

$$s'=s \oplus r_a \oplus r_b \oplus r_c,$$

where s is the original source data, $r_a$, $r_b$, and $r_c$ are random bytes given to three of the four recipients, and s' is the encoded byte given to the fourth recipient. The original byte s can be recovered by bitwise exclusive-orring all four bytes together.

The problem of reconstructing data stored on a digital medium that is subject to damage has also been addressed in the prior art. In particular, Reed-Solomon and Cauchy Reed-Solomon coding are two well-known methods of dividing encoded information into multiple slices so that the original information can be reassembled even if all of the slices are not available. Reed-Solomon coding, Cauchy Reed-Solomon coding, and other data coding techniques are described in "Erasure Codes for Storage Applications," by Dr. James S. Plank, which is hereby incorporated by reference.

Schemes for implementing dispersed data storage networks ("DDSN"), which are also known as dispersed data storage grids, are also known in the art. In particular, U.S. Pat. No. 5,485,474, issued to Michael O. Rabin, describes a system for splitting a segment of digital information into n data slices, which are stored in separate devices. When the data segment must be retrieved, only m of the original data slices are required to reconstruct the data segment, where n>m.

Prior art DDSN systems are only viable for extremely specialized applications, as implementing an effective DDSN requires that a user setup a network of slice servers in multiple physically disparate locations. Existing directory service software will not effectively manage access to a DDSN, particularly as a DDSN does not have physical resources in the sense of a disk drive or directory, but rather is a type of virtual drive, where information is spread across numerous slice servers. Therefore, software for managing access to a DDSN would make DDSN technology accessible to a wider variety of applications.

In addition, the management and administration of a DDSN presents other problems that are not associated with prior art systems. For example, different users of a DDSN may want to store their data in different ways, i.e., one user may want all of their data compressed to save on storage space, while another user may not want to compress their data to improve retrieval speed. Further, a network of slice servers can be used to implement numerous DDSNs, each having different characteristics, and using a subset or all of the available slice servers to store data.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 4 is a data relationship diagram illustrating the relationship between user accounts and virtualized data storage vaults, as well as the structure of account and vault constructs.

DETAILED DESCRIPTION OF THE ILLUSTRATED EMBODIMENT

Figure 1:
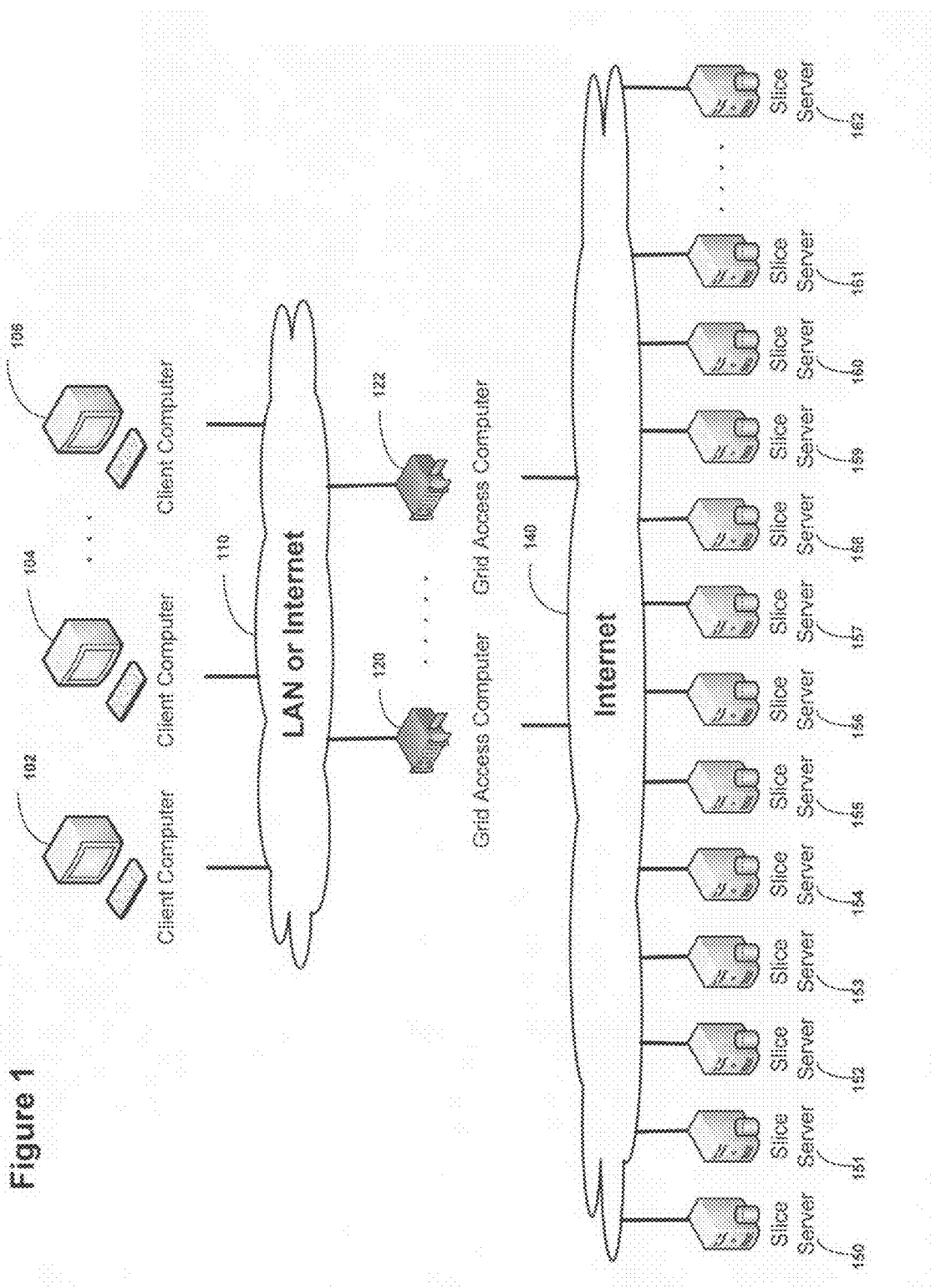
FIG. 1 is a network diagram of a dispersed data storage network constructed in accordance with an embodiment of the disclosed invention.

Turning to the Figures and to FIG. 1 in particular, a distributed computer system implementing a dispersed data storage grid 100 is shown. An arbitrary number of slice servers 150-162 store data slices sent to them by networked client computers 102, 104, 106. As illustrated, some number of grid access computers 120, 122 allows access to the slice servers 150-162 by the client computers 102, 104, 106. Data segments are written to the grid by client computers 102, 104, 106. In accordance with an information dispersal algorithm, the data segments are sliced into multiple data slices that are then stored on slice servers 150-162.

As explained herein, the disclosed invention allows a network of slice servers to implement numerous dispersed data storage networks. In accordance with the disclosed invention, a subset of the available slice servers 150-162 is associated with a user account to form a dispersed data storage network. This information is stored in an accessible location, such as a grid access computer 120, 122, on each client computer 102, 104, 106, or elsewhere. This software construct, which is referred to herein as a "vault," allows for numerous DDSNs to be implemented from a network of slice servers. Each vault makes use of some number of slice servers, and a particular slice server may be associated with any number of vaults. There is no fixed relation between slice servers comprising a vault, except by the vault construct itself. By example, a first vault may be comprised of 16 slice servers. A second vault may utilize 4 slice servers in common with the first vault, and an additional 8 that are not used by the first vault.

In addition to storing information about what slice servers make up a particular DDSN, a vault will also store other information pertinent to the operation of a DDSN. This information includes what information dispersal algorithm ("IDA") is used on the DDSN, as well as the information required to operate the particular IDA, such as the number of slices that each data segment is divided into as well, which is also referred to as the quantity n, and the minimum number of data slices required to reconstruct a stored data segment, which is also referred to as the quantity m.

The vault also conglomerates other information that is relevant to the operation of a DDSN. The total storage that is available in a particular vault is stored, as well as the amount of storage that is presently occupied by data segments. In a fee-for-service system, this will prevent a particular user from using more storage than was paid for. In addition, a particular vault may require that data be encrypted, either before it is sliced, after it is sliced, or both before and after it is sliced. Accordingly, the vault structure can contain a field indicating that data segments and/or data slices are encrypted, as well as the particular algorithm that is used for encryption.

For certain applications, data stored on a DDSN may be compressed to increase the total amount of storage available. However, the use of compression can increase the time required to write and retrieve data. Accordingly, the vault can contain a field indicating if compression is to be used, and what type of compression should be used. In addition, while almost every DDSN makes use of integrity checks, certain applications may be better served by different types of integrity checks. For this purpose, the vault may contain a field allowing a user to specify a specific type of integrity check to be used for stored data segments as well as for stored data slices.

In addition to storing information about the particular DDSN associated with a vault, a vault may also include an access control list specifying which accounts are allowed to access the vault, and what permissions are associated with that account. For example, one user may have full access to a vault, while another user may only be allowed to read data segments from the vault, and not write data segments to, or modify data segments stored on the vault.

Figure 2:
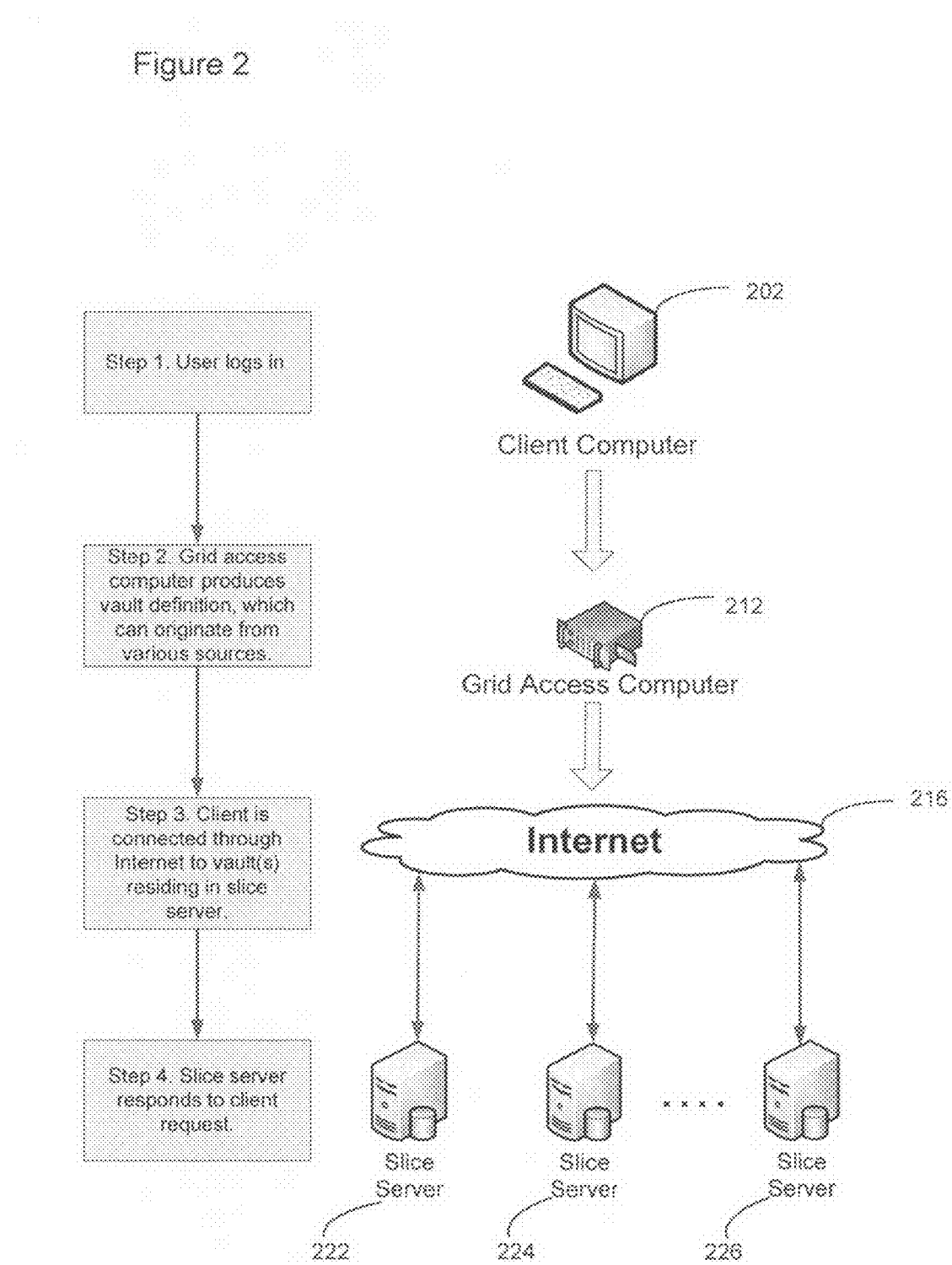
FIG. 2 is a simplified network diagram of the operation of one aspect of the disclosed invention by which a plurality of dispersed data storage networks can be implemented from a set of slice servers.

FIG. 2 explains the process of how access to a DDSN is handled through a vault. A user logs into a particular account at a client computer 202. As part of the login process, a grid access computer 212 assembles a vault definition, which may be resident on the grid access computer 212, stored on the slice servers 222, 224, 226 as distributed data, or stored elsewhere. The vault structure moderates access to a DDSN comprised of slice servers 222,224,226 by the client computer 202.

Figure 3:
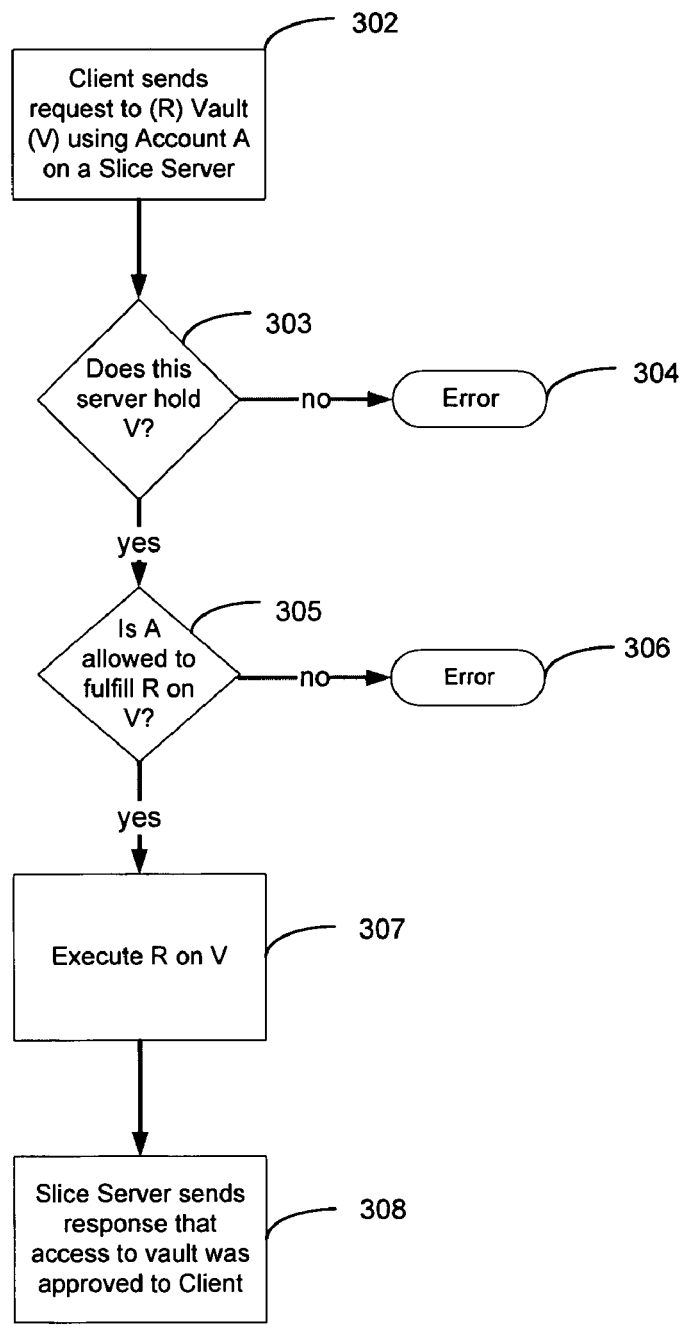
FIG. 3 is a flowchart illustrating the process by which a slice server authenticates requests received from various computers accessing a dispersed data storage network.

FIG. 3 illustrates the process by which a slice server authenticates a request from a client. After a client has logged into a vault, a client computer will originate one or more requests in step 302. Those requests will be directed to the appropriate slice server, and the slice server will validate that it can accept requests from the vault identified in the request in step 303. If the slice server cannot accept requests from the identified vault, an error is generated in step 304. The slice server also validates that the account identified in the request is allowed to make the specified request in step 305. If the slice server accepts requests from the identified vault and the identified account is allowed to make the specified request, the slice server will execute the request in step 307, and send a response back to the requesting client in step 308.

FIG. 4 illustrates the relationship between user accounts and vaults. Three vaults 402,404,406 are depicted, as well as nine users 410-418. Users 410, 411, and 412 have access to vault 402. User 412 also has access to vault 2, and as indicated, there is a many to many relationship between vaults and user accounts. Data structure 440 illustrates one way that vault information could be maintained. In particular, the illustrated structure shows the information dispersal algorithm used on the DDSN associated with the vault, i.e., Cauchy-Reed Solomon. In addition, the information dispersal parameters are identified, i.e., data segments are divided into 112 data slices, of which any 18 may be lost without compromising the integrity of the stored data. Further, the vault data structure shows that no data compression is used, and that CRC-32 is used as an integrity check for both stored data segments and stored data slices. As illustrated, the data structure 440 does not indicate if stored data is encrypted, although alternative data structures could. Finally, data structure 440 lists three accounts that are allowed to access this particular vault. In addition to listing the associated accounts, the permissions granted to those accounts could also be listed here as well. As permissions are well-known in the art, they are not discussed further here.

FIG. 4 also shows data structure 430, which illustrates one way that a user account could be represented, namely by a username and a password. However, this particular representation of a user account is not a limitation of the invention; other methods well-known in the prior art would work just as well, for instance, biometric information.

The foregoing description of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

What is claimed is:

1. A distributed computer system comprising:
   a plurality of slice servers each including a network port coupled to a network; and
   a grid access computer including a network port coupled to the network, wherein the grid computer functioning to:
   receive a request to access a virtual digital data storage vault, wherein a set of the plurality of slice servers support the virtual digital data storage vault;
   retrieve a vault data structure corresponding to the virtual digital data storage vault;
   authenticate the request in accordance with information of the vault data structure;
   when the request is authenticated, send the request to the set of the plurality of slice servers;
   a slice server of the set of plurality of slice servers functioning to:
   receive the request to access the virtual digital data storage vault;
   determine whether the slice server supports the virtual digital data storage vault; when the slice server supports the virtual digital data storage vault, determine whether type of request is allowed;
   when the type of request is allowed, execute the request to generate a response; and
   send the response via the network port.

2. The distributed computer system of claim 1, wherein the vault data structure comprises:
   a vault identifier;
   identity of the set of the plurality of slice servers that is coupled to the network;
   an access control list that identifies at least one user account having access to the virtual digital data storage vault; and
   an information dispersal algorithm for use on said virtual data storage vault and a set of dispersal parameters.

3. The distributed computer system of claim 1, wherein the vault data structure comprises: a maximum amount of storage for the virtual digital data storage vault.

4. The distributed computer system of claim 1, wherein the vault data structure comprises: an indication of an encryption algorithm is used to encrypt data segments stored on the virtual digital data storage vault.

5. The distributed computer system of claim 1, wherein the vault data structure comprises: an indication of a compression algorithm is used to compress data segments stored on the virtual digital data storage vault.

6. The distributed computer system of claim 1, further comprises:
   the grid computer functioning to:
   receive a second request to access a second virtual digital data storage vault, wherein a second set of the plurality of slice servers support the second virtual digital data storage vault;
   retrieve a second vault data structure corresponding to the second virtual digital data storage vault;
   authenticate the second request in accordance with information of the second vault data structure;
   when the second request is authenticated, send the second request to the second set of the plurality of slice servers;
   a second slice server of the second set of plurality of slice servers functioning to:
   receive the second request to access the second virtual digital data storage vault;
   determine whether the second slice server supports the second virtual digital data storage vault;
   when the slice server supports the second virtual digital data storage vault, determine whether type of request is allowed;
   when the type of request is allowed, execute the second request to generate a second response; and
   send the second response via the network port.

7. The distributed computer system of claim 1, wherein the grid access computer further functions to: access the vault data structure by retrieving the vault data structure from at least one of the plurality of slice servers.

8. A computer comprises:
   a network port operable to provide a connection to a network;
   a central processing unit operably coupled to the network port; and
   memory operably coupled to the central processing unit, wherein the memory stores, as directed by the central processing unit, a plurality of vault data structures, wherein a first vault data structure of the plurality of vault data structures includes:
   a first vault identifier;
   identity of a first set of slice servers of a plurality of slice servers that is coupled to the network, wherein a first portion of memory from each slice server of the first set of slice services constitutes a first virtual digital data storage vault; and
   a first access control list that identifies at least one user account having access to the first virtual digital data storage vault; and
   wherein a second vault data structure of the plurality of vault data structures includes:
   a second vault identifier;
   identity of a second set of slice servers of a plurality of slice servers, wherein a second portion of memory from each slice server of the second set of slice services constitutes a second virtual digital data storage vault; and
   a second access control list that identifies at least one user account having access to the second virtual digital data storage vault.

9. The computer of claim 8 further comprises: the first vault data structure further including identity of a first information dispersal algorithm and first information dispersal parameters; and the second vault data structure further including a second information identity of a second information dispersal algorithm and second information dispersal parameters.

10. The computer of claim 8 further comprises: the first vault data structure further including a first indication of use of a first data compression algorithm and identity of the first data compression algorithm; and the second vault data structure further including a second indication of use of a second data compression algorithm and identity of the second data compression algorithm.

11. The computer of claim 8 further comprises: the first vault data structure further including a first indication of use of a first integrity check algorithm and identity of the first integrity check algorithm; and the second vault data structure further including a second indication of use of a second integrity check algorithm and identity of the second integrity check algorithm.

12. The computer of claim 8 further comprises: the first vault data structure further including a first indication of use of a first encryption algorithm and identity of the first encryption algorithm; and the second vault data structure further including a second indication of use of a second encryption algorithm and identity of the second encryption algorithm.

13. The computer of claim 8 further comprises: the first access control further including, for each of the at least one user account having access to the first virtual digital data storage vault, permissions regarding the access; and the second access control further including, for each of the at least one user account having access to the second virtual digital data storage vault, permissions regarding the access.

14. The computer of claim 8 further comprises: a user account data structure that identifies the at least one user account.

* * * * *